United States Patent
You (10) Patent No.: US 8,917,343 B2
(45) Date of Patent: Dec. 23, 2014

(54) DIGITAL PHOTOGRAPHING APPARATUS AND CONTROL METHOD THEREOF

(75) Inventor: Ju-yeon You, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 242 days.

(21) Appl. No.: 13/303,262

(22) Filed: Nov. 23, 2011

(65) Prior Publication Data

US 2012/0176503 A1 Jul. 12, 2012

(30) Foreign Application Priority Data

Jan. 11, 2011 (KR) ........................ 10-2011-0002883

(51) Int. Cl.
*H04N 5/222* (2006.01)
*H04N 5/232* (2006.01)
*H04N 9/82* (2006.01)
*H04N 9/804* (2006.01)
*H04N 5/77* (2006.01)
*H04N 1/00* (2006.01)
*H04N 5/907* (2006.01)
*H04N 101/00* (2006.01)

(52) U.S. Cl.
CPC ....... *H04N 1/00411* (2013.01); *H04N 5/23293* (2013.01); *H04N 9/8205* (2013.01); *H04N 9/8042* (2013.01); *H04N 5/772* (2013.01); *H04N 2101/00* (2013.01); *H04N 1/00458* (2013.01); *H04N 5/907* (2013.01); *H04N 1/00442* (2013.01)
USPC .................................................. 348/333.05

(58) Field of Classification Search
USPC ............... 348/220.1, 333.01, 333.02, 333.05, 348/333.11
See application file for complete search history.

(56) References Cited

U.S. PATENT DOCUMENTS

| | | | |
|---|---|---|---|
| 5,172,234 A | 12/1992 | Arita et al. | |
| 5,836,770 A | 11/1998 | Powers | |
| 6,871,010 B1 * | 3/2005 | Taguchi et al. | 386/230 |
| 7,411,623 B2 * | 8/2008 | Shibutani | 348/333.02 |
| 7,729,608 B2 * | 6/2010 | Okubo | 396/374 |
| 8,437,623 B2 * | 5/2013 | Ohnishi | 386/328 |
| 2002/0047910 A1 | 4/2002 | Tariki | |
| 2005/0069297 A1 * | 3/2005 | Kobayashi et al. | 386/120 |
| 2009/0027494 A1 | 1/2009 | Cavallaro et al. | |
| 2009/0115861 A1 * | 5/2009 | Mochizuki | 348/220.1 |
| 2009/0278959 A1 | 11/2009 | Kato | |
| 2010/0053342 A1 | 3/2010 | Hwang et al. | |
| 2012/0002065 A1 * | 1/2012 | Park et al. | 348/220.1 |
| 2012/0084682 A1 * | 4/2012 | Sirpal et al. | 715/761 |

FOREIGN PATENT DOCUMENTS

EP 1 526 727 A1 4/2005

OTHER PUBLICATIONS

Search Report established for GB 1121696.7 (Apr. 5, 2012).

* cited by examiner

*Primary Examiner* — Timothy J Henn
(74) *Attorney, Agent, or Firm* — Drinker Biddle & Reath LLP (57) ABSTRACT

Disclosed are a digital photographing apparatus and a control method thereof. According to the digital photographing apparatus and the control method thereof, a user is allowed to manage data, captured in the same event, within a single display screen regardless of the kinds of contents and to easily perform switching between contents.

19 Claims, 7 Drawing Sheets

FIG. 8

DIGITAL PHOTOGRAPHING APPARATUS AND CONTROL METHOD THEREOF

CROSS-REFERENCE TO RELATED PATENT APPLICATION

This application claims the benefit of Korean Patent Application No. 10-2011-0002883, filed on Jan. 11, 2011, in the Korean Intellectual Property Office, the entire disclosure of which is incorporated herein by reference.

BACKGROUND

1. Field of the Invention

The invention relates to a digital photographing apparatus and a control method thereof, and more particularly to a digital photographing apparatus and control method thereof that provides for managing captured data acquired in a single capturing event.

2. Description of the Related Art

A digital photographing apparatus, such as a digital camera or a camcorder, may store captured data such as images, videos, recorded voice or sound, and location information. Users of the digital photographing apparatus may have a difficult time organizing or finding captured data.

SUMMARY

Therefore, there is a need in the art for a control method of a digital photographing apparatus, the control method including extracting first data and second data from a storage medium; reproducing the first data in a first region of a display screen; and reproducing the second data corresponding to the first data in a second region of the display screen.

The first data and the second data may be different types of captured data.

The first data and the second data may be different types of captured data acquired at approximately the same time and/or at the same shooting even or the same capturing event.

The method may include reproducing the first data in the second region and reproducing the second data in the first region according to a selection signal corresponding to a user's selection.

The reproducing of the second data in the second region may include searching the storage medium to find data captured at approximately a shooting timing of the first data; and reproducing the found data as the second data in synchronization with playback timing of the first data.

Extracting first data and second data from a storage medium may include extracting first data from a storage medium; searching the storage medium to find data captured at approximately a shooting timing of the first data; and extracting the found data as the second data.

In a case in which the first data is still image data and the second data is video data, while the still image data is reproduced in the first region, the video data may be searched to find a frame corresponding to an approximate shooting timing of the still image data and the found frame may be reproduced in the second region.

In a case in which the first data is pieces or pictures of still image data and the second data is video data, while the pieces or pictures of still image data are reproduced in the first region as a slide show, the video data may be searched to find frames corresponding to shooting timing of the pieces of still image data and the found frames of the video data may be reproduced in the second region.

In a case in which the first data is video data and the second data is still image data, while the video data is reproduced in the first region, the still image data corresponding to a frame of the video data being reproduced may be reproduced in the second region.

In a case in which the first data is video data and the second data is pictures of still image data, while the video data is reproduced in the first region, the pictures of still image data corresponding to frames of the video data being reproduced in the first region may be reproduced in the second region as a slide show in accordance with playback timing of the video data.

The method may include switching the first data, being reproduced in the first region, to the second region to be reproduced in the second region while switching the second data, being reproduced in the second region, to the first region to be reproduced in the first region according to a selection signal corresponding to a user's selection.

The user's selection may be conducted by clicking the first region or the second region.

The user's selection may be conducted by dragging from the first region to the second region or from the second region to the first region.

The first data and the second data may be different types of captured data selected from among still image data, consecutively captured still image data, video data, snap video data, global positioning system (GPS) data, audio data, and augmented reality data.

A control method of a digital photographing apparatus is disclosed. The control method may include reproducing first captured data in a first region of a display screen; and reproducing second captured data, acquired in the same event as that of the first captured data, in a second region of the display screen.

The first captured data and the second captured data may be one of: still image data, video data, snap video data.

A digital photographing apparatus may include a storage medium configured to store first data and second data; a multi-captured data management unit configured to extract the first data and the second data from the storage medium; and a reproduction control unit configured to reproduce the first data in a first region of a display screen and configured to reproduce the second data, corresponding to the first data, in a second region of the display screen.

The multi-captured data management unit may be configured to manage the first data and the second data, which are different types of captured data acquired in the same event.

The digital photographing apparatus may include a user input management unit, configured to receive an input of a selection signal corresponding to a user's selection, and the reproduction control unit may be configured to reproduce the first data in the second region and reproduces the second data in the first region according to the received selection signal.

The multi-captured data management unit may be configured to search the storage medium to find data captured at an approximate shooting timing of the first data, and the reproduction control unit may be configured to reproduce the found data as the second data in synchronization with playback timing of the first data.

The user's selection may be conducted by clicking the first region or the second region or dragging from the first region to the second region or from the second region to the first region.

The first data and the second data may be different types of captured data selected from among still image data, consecutively captured still image data, video data, snap video data, global positioning system (GPS) data, audio data, and augmented reality data.

BRIEF DESCRIPTION OF THE DRAWINGS

The above and other features and advantages of the invention will become more apparent by describing in detail exemplary embodiments thereof with reference to the attached drawings in which.

DETAILED DESCRIPTION

Exemplary embodiments of the invention will now be described in detail with reference to accompanying drawings. The same or equivalent elements are referred to by the same reference numerals throughout the specification.

Figure 1:
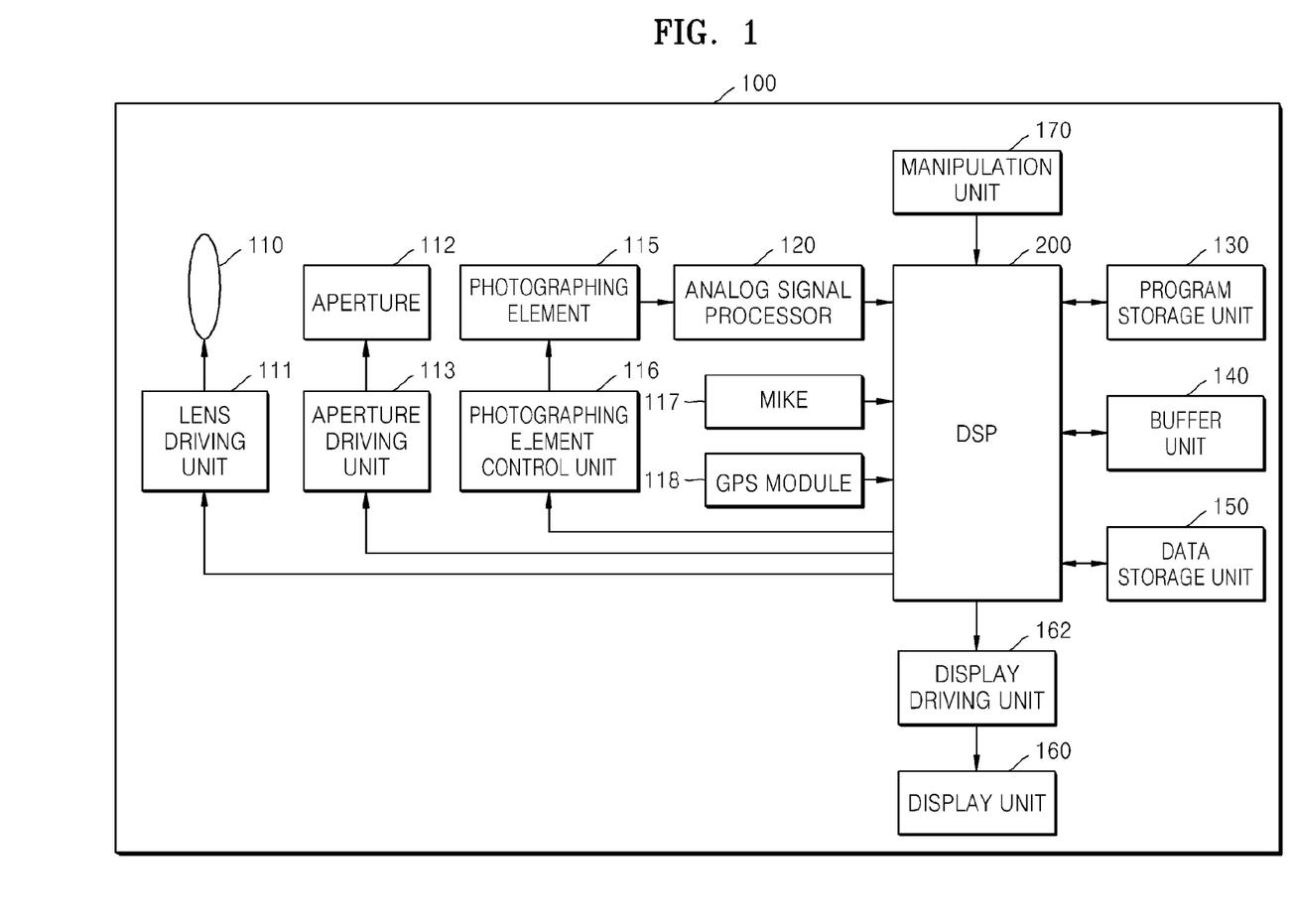
FIG. 1 is a schematic diagram showing a digital camera as an example of a digital photographing apparatus according to an exemplary embodiment of the invention.

FIG. 1 is a schematic diagram illustrating a digital camera 100 as an example of a digital photographing apparatus according to an exemplary embodiment of the invention.

A digital photographing apparatus according to an exemplary embodiment of the invention acquires multi-captured data in the same event. Herein, the event refers to a single shooting operation, for example, an operation of pressing a shutter release button or a user's intention to photograph. Here, the multi-captured data may be a combination of various types of data, such as still image data and video data, still image data and data regarding the shooting location, still image data and voice data acquired during the shooting, or still image data or video data and augmented reality data regarding the shooting location. Here, more than two types of data may be combined to constitute the multi-captured data. Furthermore, if five still images are captured during the shooting of a video for approximately one minute for example, the digital photographing apparatus according to an exemplary embodiment of the invention stores and manages both the video, approximately one minute long, and the five still images as multi-captured data.

In the disclosure, the digital camera 100 is used as one example of the digital photographing apparatus according to an exemplary embodiment of the invention. However, the digital photographing apparatus is not limited to the digital camera 100 depicted in FIG. 1, and is also applicable to various digital devices such as camera phones, personal digital assistants (PDA), portable multimedia players (PMP), camcorders and the like.

The digital camera 100 according to an exemplary embodiment of the invention includes a lens unit 110, a lens driving unit 111, an aperture 112, an aperture driving unit 113, a photographing element 115, a photographing element control unit 116, an analog signal processor 120, a program storage unit 130, a buffer unit 140, a data storage unit 150, a display driving unit 162, a display unit 160, a digital signal processor (DSP) 200, and a manipulation unit 170. Here, the lens unit 110, the lens driving unit 111, the aperture 112, the aperture driving unit 113, the photographing element 115, the photographing element control unit 116, the analog signal processor 120 may be referred to as a photographing section.

The lens unit 110 condenses optical signals. The lens unit 110 includes a zoom lens for providing control so as to extend or reduce a field of view according to a focal length, a focus lens for focusing on an object, and the like. The zoom lens and the focus lens may be configured as individual lenses or a group of a plurality of lenses. The aperture 112 controls the amount of incident light according to the extent to which it is opened or closed.

The lens driving unit 111 and the aperture driving unit 113 receive control signals from a DSP 200 and thereby drive the lens unit 110 and the aperture 112, respectively. The lens driving unit 111 controls a focal length by controlling lens locations and performs operations such as auto-focusing, zooming, focusing, and the like. The aperture driving unit 113 controls the extent to which the aperture 112 is opened or closed, in particular, the f-number or an aperture value, and thereby performs operations such as auto-focusing, automatic exposure compensation, focusing, and depth of field (DOF) adjustment An optical signal, having passed through the lens unit 110, reaches a light-receiving surface of the photographing element 115 and forms an image of an object thereon. The photographing element 115 may utilize a charge-coupled device (CCD), a complementary metal-oxide semiconductor (CMOS) image sensor (CIS), or a high-speed image sensor for converting an optical signal into an electrical signal. The photographing element 115 may be controlled by the photographing element control unit 116 in terms of sensitivity and the like. The photographing element control unit 116 may control the photographing element 115 according to a control signal automatically generated by an image signal input in real-time or a control signal input manually by user manipulation. The time for which the photographing element 115 is exposed is controlled by a shutter (not shown). The shutter may be a mechanical shutter controlling the incidence of light by moving a cover, or an electronic shutter controlling exposure by providing an electric signal to the photographing element 115.

The analog signal processor 120 performs noise reduction, gain control, wave shaping, analog-to-digital conversion, and the like upon an analog signal supplied from the photographing element 115.

A microphone 117 captures an external voice or sound, converts the same into an electrical signal, and provides the electrical signal to the DSP 200. The DSP 200 processes the provided electrical signal into voice data, and matches the voice data with captured still image data or video data.

The global positioning system (GPS) module 118 receives a signal transmitted from a GPS satellite and determines location information accordingly. The GPS module 118 provides the determined location information to the DSP 200. The DSP 200 processes the location information into location data, and matches the location data with captured still image data or video data. Here, the GPS module 118 receives signals transmitted from three or more GPS satellites to determine the location of the digital camera 100.

The manipulation unit 170 allows external input of control signals from a user, for example. The manipulation unit 170 may include a shutter-release button to input a shutter-release signal for taking a picture with the photographing element 115 exposed to light for a predetermined period, a power button to input a control signal for controlling power ON/OFF, a wide-angle zooming button and a telephoto zooming button for extending or reducing a field of view depending on an input, and a variety of functional buttons for the input of letters, the selection of a mode, such as a shooting mode, a playback mode, etc., the selection of a white balance setting function, the selection of an exposure setting function and the like. As described above, the manipulation unit 170 may be configured with various buttons; however, it is not limited to the described configuration. For example, the manipulation unit 170 may be implemented in any configuration permitting a user's input using a keyboard, a touchpad, a touch screen, a remote controller, or the like.

The digital camera 100 includes the program storage unit 130 for storing a program, such as an application system or an operating system for driving the digital camera 100, the buffer unit 140 for temporarily storing data required for computation or result data, and the data storage unit 150 for storing various information for a program including image files including video signals.

The digital camera 100 includes the display unit 160 to display the operational state of the digital camera 100, or still image data or video data captured by the digital camera 100. The display unit 170 may provide a user with visual or audio information. To provide the visual information, the display unit 160 may be configured as, for example, a liquid crystal display (LCD) panel, an organic light emitting display (OLED) panel, or the like. The display driving unit 162 supplies a driving signal to the display unit 160.

Also, the digital camera 100 includes the DSP 200 that processes an input image signal and controls each component according to the input image signal or an externally input signal. The DSP 200 may reduce noise in input image data and perform image signal processing for image quality improvement, such as gamma correction, color filter array interpolation, color matrix, color correction, color enhancement and the like. Furthermore, the DSP 200 may create an image file by compressing image data generated through image signal processing for image quality improvement, or restore image data from an image file. An image compression type may be reversible or irreversible. The compressed data may be stored in the data storage unit 150. Also, the DSP 200 may functionally perform unsharpness processing, color processing, blur processing, edge enhancement, image interpretation, image recognition, image effect processing and the like. The image recognition processing may provide face recognition, scene recognition, and the like. For example, brightness level adjustment, color correction, contrast adjustment, outline enhancement, image division, character creation, image composition, etc. may be performed.

Furthermore, the DSP 200 may execute a program stored in the program storage unit 130 or generate control signals for controlling auto-focusing, zooming, focusing, automatic exposure compensation, and the like, with a separate module and provide the control signals to the lens driving unit 111, the aperture driving unit 113, and the photographing element control unit 116, thereby controlling overall operation of components of the digital camera 100, such as a shutter, a flash, and the like.

Figure 2:
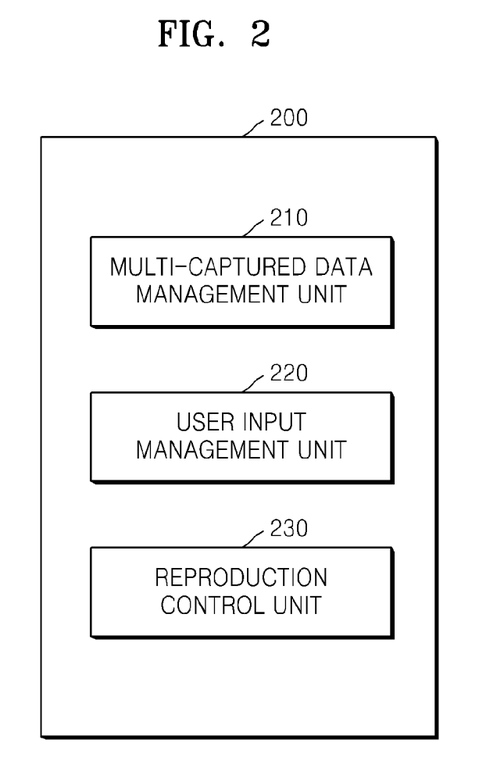
FIG. 2 is a block diagram showing a digital signal processor 200 depicted in FIG. 1, in detail.

FIG. 2 is a block diagram illustrating the DSP 200 in detail according to an exemplary embodiment of the invention.

Referring to FIG. 2, the DSP 200 includes a multi-captured data management unit 210, a user input management unit 220, and a reproduction control unit 230.

According to an exemplary embodiment of the invention, the DSP 200 manages different types of data captured in the same event, and divides a display region of the display unit 160, in particular, a display screen, into a first region and a second region and reproduces one type of data in the first region while reproducing other type of data in the second region. Here, the first region may be a main display region and the second region may be an auxiliary display region and vice versa. In the disclosure, data reproduced in the first region is defined as first data and data reproduced in the second region is defined as second data; however, the pieces of data being reproduced are not limited to only two types of data and may be a combination of more than two types of data. Here, the first data and the second data are different types of captured data selected from among still image data, consecutively captured still image data, video data, snap video data, GPS data, audio data, and augmented reality data. The data being reproduced on the display unit 160 is not limited to the above-described data and may be other type of data.

The multi-captured data management unit 210 extracts first data and second data from a storage medium. When a user's selection is made in a playback mode, the multi-captured data management unit 210 loads the first data, selected by the user, and the second data, namely, the multi-captured data stored in association with the selected first data, from the storage medium, thereby preparing for the reproduction thereof. Here, the storage medium may be the data storage unit 150 depicted in FIG. 1 or a detachable memory card (not shown). Here, the multi-captured data refers to different types of captured data acquired in the same event, and includes at least two types of data selected from among still image data, consecutively captured still image data, snap video data, GPS data, audio data, augmented reality data, and the like. For example, the multi-captured data may be video data, approximately one minute long, and five still images captured during the shooting of the video data, the five still images and GPS data regarding a location of the shooting, or one still image and augmented reality data regarding the location of the shooting. The multi-captured data management unit 210 manages at least two different types of data, acquired from a single shooting operation, so as to match each other. If there is a request for reproducing any type of data, matching multi-captured data is extracted together with the requested data.

Furthermore, the multi-captured data management unit 210 searches the storage medium to find data captured at the approximately the time of the capturing of the first data, that is, the shooting time of the first data. The reproduction control unit 230 provides control so as to reproduce the data, found by the multi-captured data management unit 210, as the second data in synchronization with approximately the same time of the reproduction of the first data, that is, the playback time of the first data. For example, in the case in which the first data is a still image and the second data is a video, while the still image is reproduced in the first region, the video data may be searched to find a frame corresponding to the shooting timing of the still image and then reproduced in the second region from the found frame. Furthermore, in the case in which the first data includes a plurality of still images and the second data is a video, while a slide show of the plurality of still images is reproduced in the first region, the video may be searched to find frames corresponding to the shooting timing of the still images being reproduced and the found frames may be reproduced in the second region.

On the other hand, in the case in which the first data is a video and the second data is a still image, while the video is reproduced in the first region, a still image corresponding to a frame of the video being reproduced may be reproduced in the second region. Also, in the case in which the first data is a video and the second data is a plurality of still images, while the video is reproduced in the first region, a slide show of the plurality of still images corresponding to frames of the video being reproduced may be reproduced in the second region in accordance with the playback timing of the video.

The user input management unit 200 receives a selection signal corresponding to a user's selection. Here, the user's selection is conducted by clicking the first region or the second region, or dragging from the first region to the second region or from the second region to the first region.

The reproduction control unit 230 reproduces the first data in the first region of a display screen, and the second data corresponding to the first data is reproduced in the second region of the display screen. When a user's selection for switching is made by, for example, clicking data being reproduced in any one region or dragging data from the first region to the second region, the reproduction control unit 230 may switch the first data, being reproduced in the first region, to the second region to be reproduced therein while switching the second data, being reproduced in the second region, to the first region to be reproduced therein.

Figure 3A:
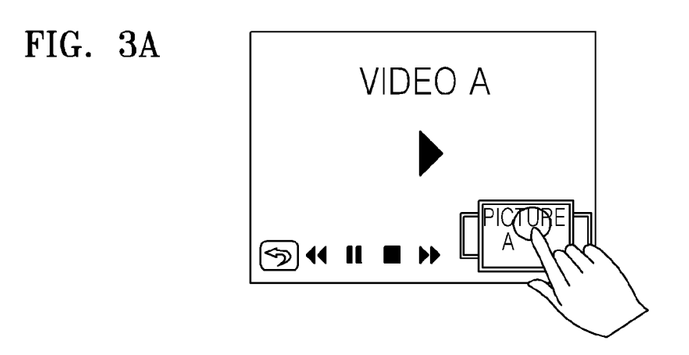
FIGS. 3A and 3B are views for explaining the reproduction of multi-captured data according to an exemplary embodiment of the invention.
Figure 3B:
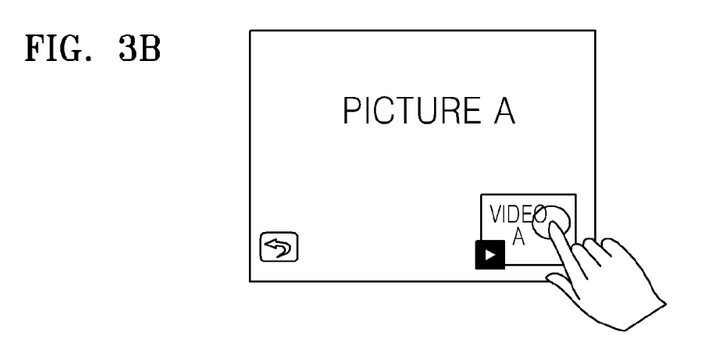

FIGS. 3A and 3B are views for explaining the reproduction of multi-captured data according to another exemplary embodiment of the invention.

Referring to FIG. 3A, video A is reproduced in the first region of the display screen, and a plurality of pictures regarding the video A are reproduced in the second region thereof, namely, the lower right side of the display screen. Video playback-related interfaces for controlling the video A being reproduced in the first region are provided in the first region. In the second region, a plurality of pictures may be reproduced as a slide show, pictures A-1 and A-2 captured at a corresponding time or timing may be sequentially reproduced according to the playback time of the video A, or the picture A-1 may be reproduced first and thereafter, the next picture, the picture A-2, may then be reproduced according to a user's dragging operation for selection. When a user clicks the picture A of the second region, as in FIG. 3A, the picture A may be displayed in the first region and the video A may be reproduced in the second region as shown in FIG. 3B. In this case, when the user touches a playback start menu provided in the second region, the video A is reproduced in the second region. Likewise, as shown in FIG. 3B, when the user clicks the second region, the display screen is switched to the reproduction screen, as shown in FIG. 3A.

Figure 4:
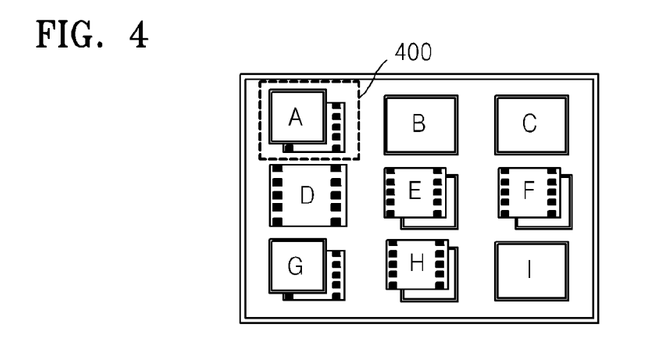
FIGS. 4 and 5 are views for explaining multi-captured data according to another exemplary embodiment of the invention.
Figure 5:
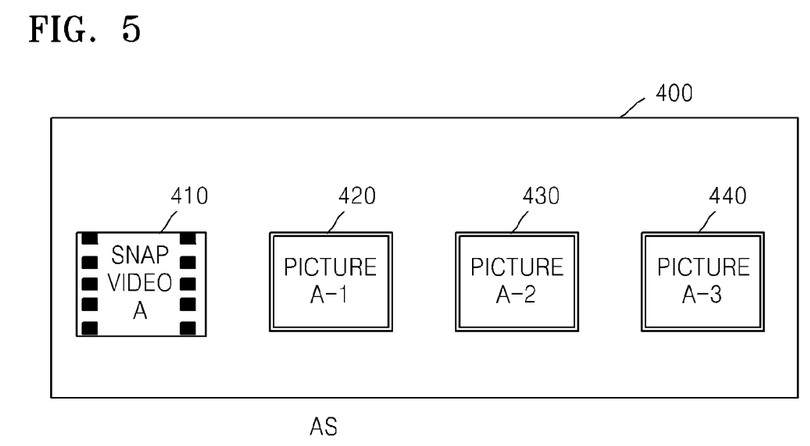

FIGS. 4 and 5 are views for explaining multi-captured data according to another exemplary embodiment of the invention.

FIG. 4 illustrates folders stored in a storage medium in a playback mode. Here, as indicated by reference numeral 400, a folder including two or more icons is a folder that contains multi-captured data. When a user clicks folder A, multi-captured data files 410 to 440 included in the folder A are displayed as shown in FIG. 5. FIG. 5 illustrates multi-captured data including snap video A 410, picture A-1 420, picture A-2 430 and picture A-3 440. For example, during the shooting of the snap video A 410, approximately one minute long, the picture A-1 420 captured at the very beginning of the shooting, the picture A-2 430 captured at 20 seconds, and the picture A-3 440 captured at 40 seconds are stored in a single multi-captured data or multi-format folder 400. When a user selects any piece of data from a file structure shown in FIG. 5, the selected data is reproduced in the first region and the rest of the captured data is reproduced in the second region. For example, when a user selects the picture A-1 420, the picture A-1 420 is displayed in the first region, and the snap video A 410 is reproduced in the second region.

Figure 6A:
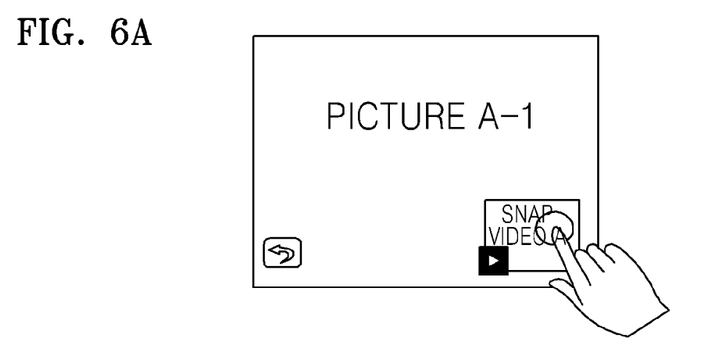
FIGS. 6A through 6F are views for explaining the reproduction of multi-captured data according to another exemplary embodiment of the invention.

Referring to FIG. 6A, when a user selects the picture A-1 420 in the folder structure depicted in FIG. 5, the selected picture A-1 420 is displayed in the first region, and the snap video A 410, namely, multi-captured data captured in the same event as that of the picture A, is reproduced in the second region. In this case, the snap video A 410 may be reproduced by clicking a playback start menu provided in the second region. Here, the pictures A-1 420, A-2 420, and A-3 440 included in the picture A, displayed in the first region, may be reproduced as a slide show. Also, the picture A-2 430 or the picture A-3 440 is reproduced upon a user's selection of the first region, that is, by dragging the first region to the left or right. Furthermore, the snap video A 410, being reproduced in the second region, may be reproduced in synchronization with the pictures being reproduced in the first region. For example, while the picture A-1 420 is being reproduced in the first region, the snap video A 410 is searched to find a frame corresponding to the picture A-1 and thus reproduced from the corresponding frame.

Figure 6B:
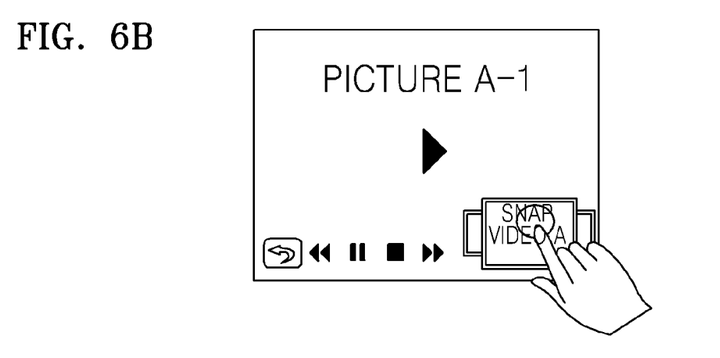
Figure 6C:
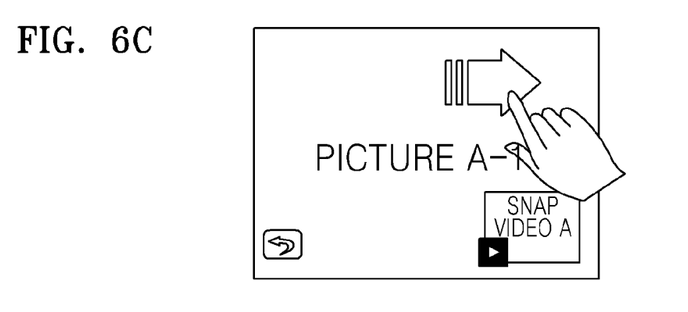

While the picture A-2 430 is being reproduced, the snap video A 410 may be reproduced from a frame corresponding to the shooting timing of the picture A-2 430, namely, 20 seconds. When the user clicks the second region, as shown in FIG. 6A, the snap video A 410 is reproduced in the first region as shown in FIG. 6B, and the pictures A-1 420, A-2 430, and A-3 440 are reproduced in the second region. In this case, the switching of the reproduction may be carried out upon a user's selection by, for example, clicking the second region or dragging from the second region to the first region. When the user clicks the picture A-1 420 being displayed in the second region, as shown in FIG. 6B, the picture A-1 420 is displayed in the first region and the snap video A 410 is prepared for playback in the second region, as shown in FIG. 6C. In the drawing, the snap video A 410 is currently being prepared for playback and is reproduced when the user selects a playback start menu reproduction. However, the snap video A 410 may be reproduced as soon as the reproduction is switched. Alternatively, the snap video A 410 may be reproduced from a frame coinciding with the shooting timing of the picture A-1 420.

Figure 6D:
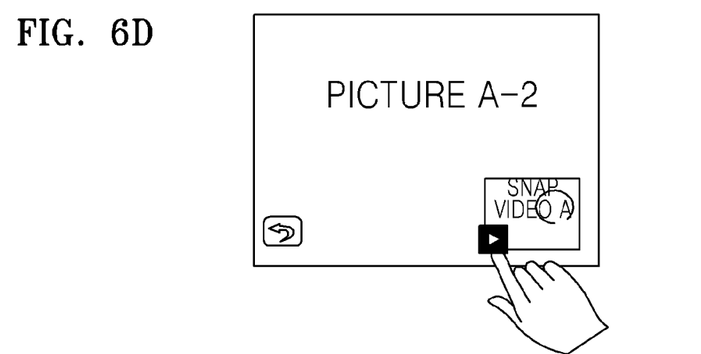
Figure 6E:
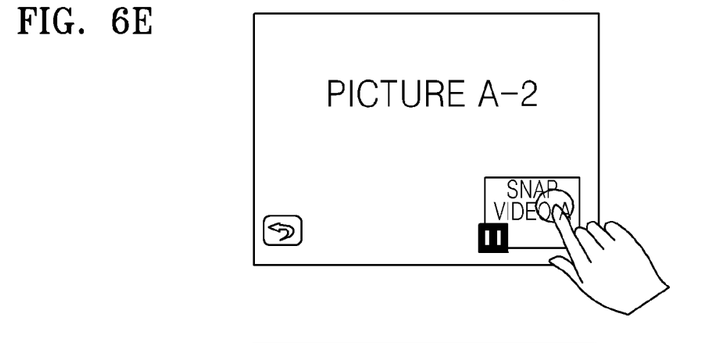
Figure 6F:
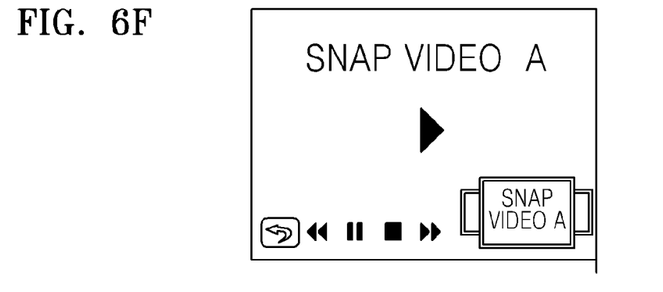

When the user drags the first region or the picture A-1 420, being reproduced in the first region, to the right as shown in FIG. 6C, the picture A-2 430, the next picture, is reproduced as shown in FIG. 6D. Then, when the playback start menu provided in the second region is selected, the snap video A 410 is reproduced as shown in FIG. 6E. Thereafter, when the user clicks the second region or the snap video A 410, being reproduced in the second region, the snap video A 410 is prepared for playback in the first region and the picture A-2 430 is reproduced in the second region.

As described above with reference to FIGS. 6A through 6F, the reproduction of multi-captured data according to an exemplary embodiment of the invention provides a new level of convenience by providing contents allowing a video and a picture to be simultaneously viewed in a complementary fashion. In the case in which a video and a picture are simultaneously captured, an image configuration within a reproduced image and a content management tool are provided to allow both the video and the picture to be viewed at the same time. Also, the simultaneously captured video and picture are linked with each other for video reproduction, a picture slide show and the like, and thus interchangeably reproduced as bigger and smaller images. Furthermore, an automatic image search function is provided by searching for the point of time when the simultaneous capturing took place, and thus user convenience can be improved.

Furthermore, in the above-described embodiment, the multi-captured data, including snap videos and pictures, is described in terms of the operation and switching thereof; however, it is not limited to the described data types, and various types of multi-captured data may be interchangeably provided in the first region and the second region in the same manner as described above. The various types of multi-captured data include, for example, a picture and a map image displaying GPS data, a picture and a voice recorded during the shooting of the picture, and a video and augmented reality data regarding the location of the shooting. Also, only the first data and the second data have been described herein as being displayed in the first region and the second region, respectively; however, the invention is not limited thereto. Three types of data may be reproduced in three respective regions and managed in the same manner as described above.

Figure 7:
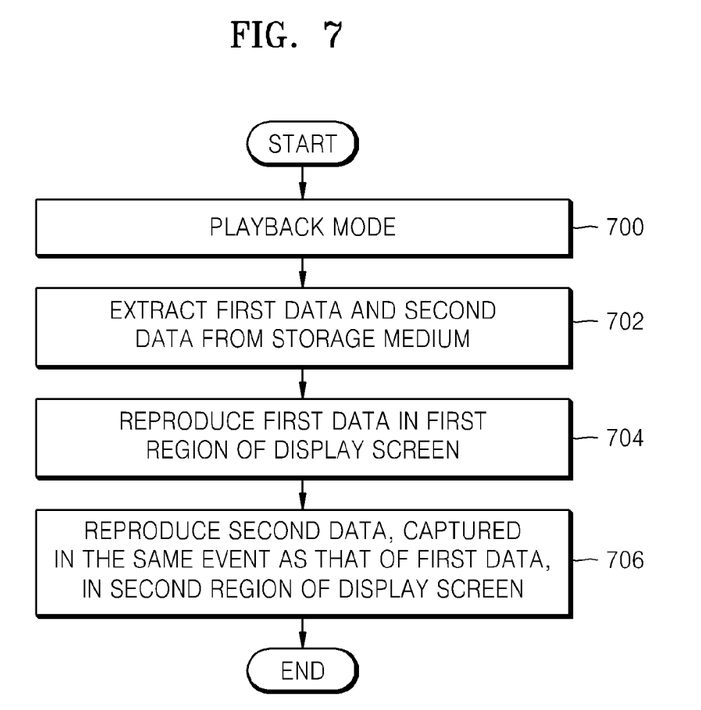
FIG. 7 is a flowchart for explaining a control method of a digital photographing apparatus, according to an exemplary embodiment of the invention.

FIG. 7 is a flowchart for explaining a control method of a digital photographing apparatus, according to an exemplary embodiment of the invention.

Referring to FIG. 7, a playback mode is selected in operation 700. In operation 702, first data and second data are extracted from a storage medium. Herein, the first data and the second data refer to different types of captured data acquired in the same event, and are at least two different types of data selected from among still image data, consecutively captured still image data, video data, snap video data, GPS data, audio data, augmented reality data, and the like.

In operation 704, the first data is reproduced in the first region of a display screen. In operation 706, the second data, captured in the same event as that of the first data, is reproduced in the second region of the display screen. Here, the first region may be a main screen while the second region may be a sub-screen.

Accordingly, the control method of a digital photographing apparatus, according to another exemplary embodiment of the invention, enables effective reproduction and management of multi-captured data in that different types of photography data or data acquired during shooting are reproduced on a single display screen.

Figure 8:
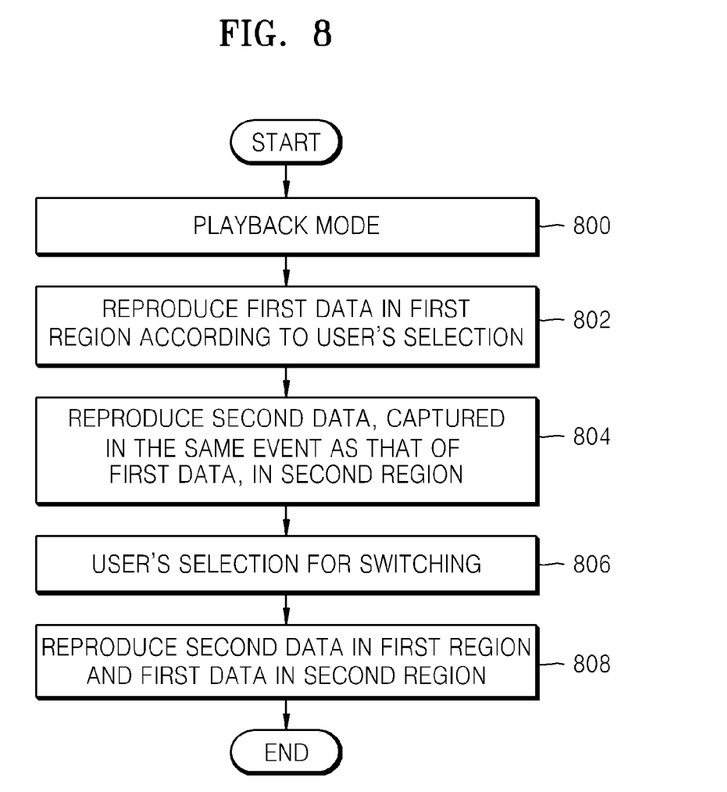
FIG. 8 is a flowchart for explaining a control method of a digital photographing apparatus, according to another exemplary embodiment of the invention.

FIG. 8 is a flowchart for explaining a control method of a digital photographing apparatus, according to another exemplary embodiment of the invention.

Referring to FIG. 8, in operation 800, a playback mode is selected. In operation 802, first data is reproduced in the first region upon a user's selection.

In operation 804, second data, captured in the same event as that of the first data, is reproduced in the second region. Here, as for the reproduction of the second data in the second region, data coinciding with approximately the first data in terms of the generation time or timing may be searched for as the second data, and this found second data may be reproduced.

In operation 806, a user's selection regarding switching is input. Here, the user's selection or the user's switching selection is conducted by clicking the first region or the second region or dragging from the first region to the second region or the second region to the first region. Here, the selecting or dragging in the first region or the second region includes selecting or dragging for the first data being reproduced in the first region or the second data being reproduced in the second region.

In operation 808, the second data and the first data are reproduced in the first region and the second region, respectively. That is, data, being reproduced in respective regions, are switched to be reproduced in different regions.

Accordingly, the control method of a digital photographing apparatus, according to another exemplary embodiment of the invention, provides a convenient user interface allowing for the reproduction of multi-captured data on a single display screen in a linked fashion and switching data, being reproduced, to be reproduced in different regions upon a user's selection.

As set forth above, in the control method of the digital photographing apparatus according to an exemplary embodiment of the invention, a user can manage data, captured in the same event, in a single display screen regardless of the kinds of contents, and easily perform switching between contents.

Furthermore, a user can have a precise and vivid memory of a scene by viewing different types of contents, such as pictures and a video, a picture and a sound, etc., at the same time.

While the invention may be embodied in many different forms, there is described herein in detail an illustrative embodiment shown in accompanying drawings with the understanding that the current disclosure is to be considered as an example of the principles of the invention and is not intended to limit the invention to the illustrated embodiment. It is intended that the invention covers the modifications and variations of this invention provided they come within the spirit and scope of the invention as defined by the appended claims, and their equivalents. Moreover, detailed descriptions related to well-known functions or configurations will be ruled out in order not to unnecessarily obscure subject matters of the invention.

Although the terms 'first', 'second', etc. may be used herein to describe various elements and/or components, these elements and/or components should not be limited by these terms. These terms are used only to differentiate one member, component, region, layer, or portion from another one.

The terminology used herein is for the purpose of describing particular embodiments only and is not intended to limit the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

An apparatus according to the invention may include a processor, a memory storing and executing program data, a permanent storage such as a disk drive, a communication port for communication with an external device, a user interface device such as a touch panel, keys or buttons, and the like. Methods embodied as a software module or an algorithm may be stored on a computer-readable recording medium as computer readable codes or program commands executable by the processor. Examples of the computer-readable recording medium include magnetic storage media (e.g., ROM, floppy disks, hard disks, etc.), optical recording media (e.g., CD-ROMs, or DVDs), and the like. The computer-readable recording medium can also be distributed over network-coupled computer systems so that the computer readable code is stored and executed in a distributed fashion. The medium can be read by a computer, stored in a memory, and executed by the processor.

All the documents including the public laid open documents, patent applications, patent documents, and the like cited in the invention can be merged into the invention in the same manner as that indicated by individually or specifically merging the respective cited documents or as that indicated by merging them overall in the invention.

To aid in understanding the invention, reference numerals are used in the exemplary embodiments shown in the drawings, and specific terms are used to explain the exemplary embodiments of the invention; however, they are not intended to limit the invention and may represent all the components that could be considered by those skilled in the art.

The invention may be embodied as functional blocks and various processing operations. The functional blocks may be implemented with various hardware and/or software configurations executing specific functions. For example, the invention employs integrated circuit configurations such as a memory, processing, logic, a look-up table and the like capable of executing various functions upon control of microprocessors or other control devices. In a similar manner to that in which the elements of the invention can be executed with software programming or software elements, the invention may be implemented with a scripting language or a programming language such as C, C++, Java, assembler, and the like, including various algorithms implemented by a combination of data structures, processes, processes, routines or other programming configurations. The functional aspects may be implemented by algorithms executed in one or more processors. Also, the invention may employ conversional arts to establish an electronic environment, process signals and/or process data. The terms "mechanism", "element", "means" and "configuration" may be widely used and are not limited to mechanical and physical configurations. Such terms may have the meaning of a series of routines of software in association with a processor or the like.

Specific executions described herein are merely examples and do not limit the scope of the invention in any way. For simplicity of description, other functional aspects of conventional electronic configurations, control systems, software and the systems may be omitted. Furthermore, line connections or connection members between elements depicted in the drawings represent functional connections and/or physical or circuit connections by way of example, and in actual applications, they may be replaced or embodied as various additional functional connection, physical connection or circuit connections. Also, the described elements may not be inevitably required elements for the application of the invention unless they are specifically mentioned as being "essential" or "critical".

The singular forms "a," "an" and "the" in this current disclosure, in particular, claims, may be intended to include the plural forms as well. Unless otherwise defined, the ranges defined herein is intended to include any invention to which values within the range are individually applied and may be considered to be the same as individual values constituting the range in the detailed description of the invention. Finally, operations constituting the method of the invention may be performed in appropriate order unless explicitly described in terms of order or described to the contrary. The invention is not necessarily limited to the order of operations given in the description. The examples or exemplary terms (for example, etc.) used herein are to merely describe the invention in detail and not intended to limit the invention unless defined by the following claims. Also, those skilled in the art will readily appreciate that many alternation, combination and modifications, may be made according to design conditions and factors within the scope of the appended claims and their equivalents.

What is claimed is:

1. A control method of an electronic apparatus, the control method comprising:
    extracting first data and second data from a storage medium;
    reproducing the first data in a first region of a display screen;
    reproducing the second data corresponding to the first data in a second region of the display screen that differs from the first region; and
    switching the first data, being reproduced in the first region, to the second region to be reproduced in the second region while switching the second data, being reproduced in the second region, to the first region to be reproduced in the first region according to a user selection on at least one of the first region and the second region;
    wherein in a case in which the first data is still image data and the second data is video data, while the still image data is reproduced in the first region, the video data is searched to find a frame corresponding to an approximate shooting timing of the still image data and the found frame is reproduced in the second region.

2. The control method of claim 1, wherein the first data and the second data are different types of captured data.

3. The control method of claim 1, wherein the first data and the second data are different types of captured data acquired in the same capturing event.

4. The control method of claim 1, further comprising reproducing the first data in the second region and reproducing the second data in the first region according to a user selection signal.

5. The control method of claim 1, wherein the reproducing of the second data in the second region comprises:
    searching the storage medium to find data captured at approximately a shooting timing of the first data; and
    reproducing the found data as the second data in synchronization with playback timing of the first data.

6. The control method of claim 1, wherein the extracting first data and second data from a storage medium comprises:
    extracting first data from a storage medium;
    searching the storage medium to find data captured at approximately a shooting timing of the first data; and
    extracting the found data as the second data.

7. The control method of claim 1, wherein in a case in which the first data is video data and the second data is still image data, while the video data is reproduced in the first region, the still image data corresponding to a frame of the video data being reproduced is reproduced in the second region.

8. The control method of claim 1, wherein in a case in which the first data is video data and the second data is pictures of still image data, while the video data is reproduced in the first region, the pictures of still image data corresponding to frames of the video data being reproduced in the first region are reproduced in the second region as a slide show in accordance with playback timing of the video data.

9. The control method of claim 1, wherein the user selection is touch on the first region or the second region.

10. The control method of claim 1, wherein the user selection is a drag from the first region to the second region or from the second region to the first region.

11. The control method of claim 1, wherein the first data and the second data are different types of captured data selected by the device from among still image data, consecutively captured still image data, video data, snap video data, global positioning system (GPS) data, audio data, and augmented reality data.

12. A control method of an electronic apparatus, the control method comprising:
   extracting first data and second data from a storage medium;
   reproducing the first data in a first region of a display screen;
   reproducing the second data corresponding to the first data in a second region of the display screen that differs from the first region; and
   switching the first data, being reproduced in the first region, to the second region to be reproduced in the second region while switching the second data, being reproduced in the second region, to the first region to be reproduced in the first region according to a user selection on at least one of the first region and the second region;
   wherein in a case in which the first data is pictures of still image data and the second data is video data, while the pictures of still image data are reproduced in the first region as a slide show, the video data is searched to find frames corresponding to an approximate shooting timing of the pictures of still image data and the found frames of the video data are reproduced in the second region.

13. A control method of an electronic apparatus, the control method comprising:
   reproducing first captured data in a first region of a display screen; and
   reproducing second captured data, acquired in the same event as that of the first captured data, in a second region of the display screen that differs from the first region; and
   switching the first data, being reproduced in the first region, to the second region to be reproduced in the second region while switching the second data, being reproduced in the second region, to the first region to be reproduced in the first region according to a user selection on at least one of the first region and the second region;
   wherein in a case in which the first data is still image data and the second data is video data, while the still image data is reproduced in the first region, the video data is searched to find a frame corresponding to an approximate shooting timing of the still image data and the found frame is reproduced in the second region.

14. The control method of claim 13, wherein the first captured data and the second captured data are one of: still image data, video data, snap video data.

15. An electronic apparatus comprising:
   a storage medium configured to store first data and second data;
   a multi-captured data management unit configured to extract the first data and the second data from the storage medium;
   a reproduction control unit configured to reproduce the first data in a first region of a display screen and configured to reproduce the second data, corresponding to the first data, in a second region of the display screen that differs from the first region; and
   a user input management unit having an input that receives an input of a user selection signal;
   wherein the reproduction control unit is configured to switch the first data, being reproduced in the first region, to the second region to be reproduced in the second region while switching the second data, being reproduced in the second region, to the first region to be reproduced in the first region according to a user selection signal on at least one of the first region and the second region;
   wherein in a case in which the first data is still image data and the second data is video data, while the still image data is reproduced in the first region, the video data is searched to find a frame corresponding to an approximate shooting timing of the still image data and the found frame is reproduced in the second region.

16. The apparatus of claim 15, wherein the multi-captured data management unit is configured to manage the first data and the second data, which are different types of captured data acquired in the same event.

17. The apparatus of claim 15, wherein:
   the multi-captured data management unit is configured to search the storage medium to find data captured at an approximate shooting timing of the first data; and
   the reproduction control unit is configured to reproduce the found data as the second data in synchronization with playback timing of the first data.

18. The apparatus of claim 15, wherein the user selection is touch on the first region or the second region or a drag from the first region to the second region or from the second region to the first region.

19. The apparatus of claim 15, wherein the first data and the second data are different types of captured data selected by the device from among still image data, consecutively captured still image data, video data, snap video data, global positioning system (GPS) data, audio data, and augmented reality data.

* * * * *